United States Patent Office 3,535,425
Patented Oct. 20, 1970

3,535,425
1-CHLORO-2,2,2-TRIFLUOROETHYL DIFLUOROMETHYL ETHER AS AN ANESTHETIC AGENT
Ross C. Terrell, Plainfield, N.J., assignor to Air Reduction Company, Incorporated, New York, N.Y., a corporation of New York
No Drawing. Continuation-in-part of application Ser. No. 690,771, Dec. 15, 1967. This application Dec. 18, 1969, Ser. No. 886,397
Int. Cl. A61k 13/00
U.S. Cl. 424—342       5 Claims

ABSTRACT OF THE DISCLOSURE

This application discloses the novel compound 1-chloro-2,2,2-trifluoroethyl difluoromethyl ether having the formula $CF_3CHCl$—$O$—$CHF_2$. The compound is prepared through stepwise chlorination and fluorination reactions starting with the trifluoroethyl methyl ether. The compound is useful as an anesthetic and as a solvent and dispersant for fluorinated materials.

DESCRIPTION OF THE INVENTION

This invention relates to the compound 1-chloro-2,2,2-trifluoroethyl difluoromethyl ether, its preparation and its use in producing anesthesia in anesthetic susceptible air breathing mammals and particularly in human beings.

The present application is a continuation-in-part of U.S. application Ser. No. 690,771, filed Dec. 15, 1967, now abandoned.

The compound 1-chloro-2,2,2-trifluoroethyl difluoromethyl ether has the following formula:

$$CF_3CHCl-O-CHF_2$$

It is normally a clear, colorless liquid with a very slight odor. It has the following physical properties: boiling point 48.5° C.; vapor pressure 330 mm. at 25° C.; specific gravity 1.45; refractive index $N_D^{20}$ 1.3002 and molecular weight 174.5. The compound is nonflammable, soda lime stable, and is a potent anesthetic for anesthetic susceptible mammals and particularly human beings. The compound is also easily miscible with other organic liquids including fats and oils and has useful solvent properties, for example, as a solvent for fluorinated olefins and other fluorinated materials such as fluoro waxes. It may be used to prepare pastes and dispersions of such materials useful for coatings and the like and may be used as a degreasing agent.

There are at present two preferred procedures for the preparation of 1-chloro-2,2,2-trifluoroethyl difluoromethyl ether. The basic starting material for both procedures is trifluoroethanol $CF_3CH_2OH$ a readily available commercial material.

The trifluoroethanol $CF_3CH_2OH$ is first converted to the methyl ether precursor by reacting it with dimethylsulfate $(CH_3)_2SO_4$ in either an aqueous or nonaqueous medium. An aqueous alkaline solution of potassium, sodium or lithium hydroxides can be used as well as nonaqueous media such as dioxane, benzene, liquid hydrocarbons, tetrahydrofuran or diethyl ether. The preferred reaction medium is aqueous potassium hydroxide.

The etherification reaction can be carried out at any temperature up to the boiling point of the reaction mixture. The reaction is exothermic so it is preferred to use water cooling to control the rate of reaction. With a slight amount of water cooling and adequate stirring the reaction can be easily maintained at room temperature, approximately 20–30° C.

The reaction is very rapid with the dimethyl sulfate $(CH_3)_2SO_4$ reacting almost as fast as it is added. The reaction time is not critical, however, as in most organic reactions it is preferred to let the reaction proceed for 2 to 3 hours. The $(CH_3)_2SO_4$ should be free of acid for best results. On completion of the etherification reaction the ether can be separated from the reaction mass by fractional distillation.

The halogenation of the methyl ether precursor $$CF_3CH_2-O-CH_3$$

to form $CF_3CHCl$—$O$—$CHF_2$ can be carried out through either of two procedures. In the first procedure $$CF_3CH_2-O-CH_3$$

is chlorinated to form $CF_3CHClOCHCl_2$ which is subsequently fluorinated to form the desired $CF_3CHClOCHF_2$. In the second procedure $CF_3CH_2OCH_3$ is partially chlorinated to form $CF_3CH_2OCHCl_2$. The partially chlorinated product is then fluorinated to produce $$CF_3CH_2OCHF_2$$

The fluorinated product is again chlorinated to form the desired product $CF_3CHClOCHF_2$.

The chlorination of $CF_3CH_2$—$O$—$CH_3$ to form $$CF_3CHClOCHCl_2$$

should be carried out in either a fully or partially transparent vessel so that photo energy can be supplied to the reaction. Suitable sources of photo energy are incandescent, ultraviolet and fluorescent lamps and even strong sunlight. In view of the ready availability, low cost and ease of handling of incandescent lamps they are preferred for use as the illumination source.

The chlorination reaction is carried out by bubbling gaseous chlorine into the liquid $CF_3CH_2$—$O$—$CH_3$ while it is strongly illuminated. The chlorine is added at the same rate at which it reacts which can be determined by checking for chlorine vapor in the effluent from the chlorinator. The reaction is exothermic so cooling water should be supplied to the chlorination apparatus to control the reaction. The chlorination can be carried out at any temperature from 15° C. up to the boiling point of the chlorination mixture. Best results are usually found at 25°–35° C. where the reaction rate is fast enough and the formation of byproducts does not present a serious problem.

The effluent from the chlorination apparatus should be passed through a water scrubber to dissolve the HCl which is formed. The chlorination should be continued until 2.5–3 moles of HCl per mole of starting ether are detected by titration of the dissolved HCl with a standard base. The extent of the chlorination can be controlled by the amount of chlorine bubbled through the ether and determined by the amount of effluent HCl. If too little HCl is evolved it indicates that the chlorination products are predominantly the mono- or dichloro product. If too much HCl is determined it indicates that polychloro products have been formed or that the ether has decomposed into undesirable chlorinated reaction products.

Following the chlorination the reaction mass can be separated by fractional distillation or by vapor phase chromatography. If distillation is employed it is recommended that the pressure be reduced in view of the high molecular weight of the product $CF_3CHCl$—$O$—$CHCl_2$. Excessive heating should obviously be avoided in view of the possibility of decomposition of the desired product.

The thus prepared $CF_3CHCl$—$O$—$CHCl_2$ should then be transferred to a reaction vessel that will not be attacked during the fluorination reaction. A stainless steel, copper, nickel, or platinum vessel would be quite suitable. A catalyst such as $SbCl_5$, $SnCl_4$ or $SbF_5$ should be added to the chlorinated starting material before beginning the fluorination. The fluorination reaction can be carried out by bubbling gaseous HF through the reaction mixture or by adding solid SbF₃ to the mixture.

The fluorination reaction is preferably carried out at 0° C. Higher or lower temperatures can be employed, however, it has been found that higher temperatures produce undesirable reaction products while lower temperatures cause a slow rate of reaction.

The effluent from the fluorination apparatus should be passed through a water scrubber to collect the HCl which is formed during the reaction. The amount of HCl formed is equivalent to the number of chlorine atoms exchanged for fluorine. Too little HCl evolved indicates incomplete exchange. Too much HCl indicates either over fluorination or decomposition. The fluorination should be continued until approximately two moles of HCl are collected for each mole of CF₃CHCl—O—CHCl₂ indicating that two chlorine atoms have been exchanged. The preferred site for the fluorination is on the chlorine substituted methyl group resulting in the formation of CF₃CHCl—O—CHF₂

The desired reaction product can be readily separated from the reaction mixture by fractional distillation.

In the alternative method of preparation, methyl ether precursor CF₃CH₂—O—CH₃ is chlorinated in an apparatus similar to that previously described, however, only 1.8–2 moles of chlorine are added to form CH₃CH₂—O—OCHCl₂

As in the previous chlorination reaction the extent of chlorination is monitored by determining the amount of effluent HCl. The reaction product can be separated by fractional distillation at reduced pressure or by vapor phase chromatography.

The dichlorinated product is then fluorinated as in the final step of the first process to form CF₃CH₂—O—CHF₂. The fluorination reaction can be carried out in a similar apparatus and under essentially the same conditions. In this fluorination reaction it is not necessary to employ a catalyst, however, a catalyst can be used to speed up the rate of reaction.

Following the fluorination the CF₃CH₂—O—CHF₂ is separated from the reaction mixture by fractional distillation. The product is then returned to the chlorination apparatus used previously and a chlorination reaction is carried out under essentially the same conditions. The reaction is continued until one mole of HCl is collected per mole of CF₃CH₂—O—CHF₂ indicating that one chlorine atom has been added. The preferred site for addition of the chlorine is on the methylene group adjacent to the ether oxygen. The resulting CF₃CHCl—O—CHF₂ can be separated from the reaction mixture by fractional distillation.

Either one of the two procedures disclosed can be used for the preparation of CF₃CHCl—O—CHF₂. The second procedure has a slight advantage in that fewer unusable reaction products are formed in the partial chlorination. Any monochlorinated product can be recycled to the chlorinator for further chlorination and subsequent use.

The following examples will illustrate the procedural steps leading to the preparation of 1-chloro-2,2,2-trifluoroethyl difluoromethyl ether.

EXAMPLE 1

Preparation of the intermediate CF₃CH₂OCH₃

To a solution of 86 grams of KOH in 100 ml. of water there was added dropwise with stirring 100 grams (1 mole) of CF₃CH₂OH. To this solution there was then added dropwise and with stirring 164 grams (1.3 moles) of (CH₃)₂SO₄. The reaction mixture was allowed to stir for several hours while being maintained at 30° C. with water cooling. The resulting ether was then distilled using a Dean Stark trap and 113 grams were collected. The resulting ether was analyzed by means of vapor phase chromatography and found to be 99.32% pure.

EXAMPLE 2

Preparation of CF₃CHClOCHCl₂

Approximately 456 grams (4 moles) of CF₃CH₂OCH₃, prepared as illustrated in Example 1, were added to a water jacketed chlorinator fitted with a thermometer, a "Dry-Ice" cold finger type condenser and a fritted glass gas dispersion tube. The reaction was carried out at 25° C. with gaseous chlorine being bubbled through the solution which was exposed to a source of illumination. The effluent HCl was collected in a scrubber and aliquots were titrated with a standard base. The reaction was continued until 2.8 moles of HCl per mole of ether were titrated. Following the chlorination 805 grams of a material having a refractive index $N_D^{20}$ 1.3860 were recovered. The increased weight of the reactants corresponds to 2.5 moles of chlorine added per mole of starting ether.

The resulting material was flash distilled through a 60 x 1.5 cm. Vigreaux column to yield 797 grams of a material with a boiling range of 53°–72° C. at 150 mm. of mercury and having the following composition as determined by vapor phase chromatograph:

| | Percent |
|---|---|
| CF₃CH₂OCHCl₂ | 18 |
| CF₃CH₂OCCl₃ | 30 |
| CF₃CHClOCHCl₂ | 34 |
| CF₃CHClOCCl₃ | 18 |

This mixture was separated by fractional distillation to yield:

122 g. of CF₃CH₂OCHCl₂, B.P. 47–48° C. at 150 mm. $N_D^{20}$ 1.3670 (99% pure).

196 g. of CF₃CH₂OCCl₃, B.P. 58°–59° C. at 150 mm. $N_D^{20}$ 1.3865 (90% pure).

180 g. of CF₃CHClOCHCl₂, B.P. 59°–64° C. at 150 mm. $N_D^{20}$ 1.3885 (95% pure).

120 g. of CF₃CHClOCCl₃, B.P. 64°–65° C. at 150 mm. $N_D^{20}$ 1.4040 (97% pure).

Pure samples of each of these compounds were prepared by preparative gas chromatography and the structures were determined by elemental analysis and N.M.R. and infrared spectral analyses.

EXAMPLE 3

Preparation of CF₃CHClOCHF₂

A 1-liter 3-necked stainless steel flask was fitted with a copper "Dry-Ice" cold finger condenser, a stainless steel stirring shaft and gland and a copper gas inlet tube. To the flask there was then added 50 grams (0.23 mole) of CF₃CHClOCHCl₂ as prepared in Example 2 and 1.5 grams of SbCl₅. HF gas was then slowly bubbled through the stirred mixture which was maintained at 0° C. The reaction was run until 0.35 mole of HCl was collected, as indicated by the titration of the effluent gas which was dissolved in water. Following the fluorination 26 grams of material were recovered and determined to be 90% pure by vapor phase chromatography. Fractional distillation using a 30 x 0.5 cm. column packed with glass helices gave the pure product, B.P. 48°–48.5° C., $N_D^{20}$ 1.3002. The structure CF₃CHClOCHF₂ was determined by elemental analysis, N.M.R. and infrared spectra.

EXAMPLE 4

Preparation of CF₃CH₂OCHCl₂

In an alternative method of preparation 305.5 grams (2.72 moles) of CF₃CH₂OCH₃, prepared as illustrated in Example 1, were added to a water jacketed chlorinator fitted with a thermometer, a "Dry-Ice" cold finger type condenser and a fritted glass gas dispersion tube. The reaction was carried out at 25° C. with gaseous chlorine being bubbled through the solution which was exposed to a source of illumination. The effluent HCl was collected in an aqueous scrubber and aliquots were titrated with standard base. The reaction was continued until slightly less than 2.0 moles of HCl per mole of ether were titrated. The reaction product was then distilled as in Example 2 to yield 361 grams of $CF_3CH_2OCHCl_2$ identical to the product, B.P. 47°–48° C. at 150 mm. $N_D^{20}$ 1.3670 described in Example 2.

EXAMPLE 5

Preparation of $CF_3CH_2OCHF_2$

In an apparatus similar to that employed in Example 3 420 grams of $CF_3CH_2OCHCl_2$ were fluorinated using 1.5 g. of $SbCl_5$ as a catalyst. Following the fluorination 335 grams of material were recovered and distilled through a 60 x 2 cm. column packed with glass helices to yield 182 grams of a material with a boiling point of 29° C. and a refractive index of $N_D^{20}$ 1.2653. Upon examination by vapor phase chromatography the material was found to be 99% pure. Elemental analysis showed the compound to have the empirical formula $C_3H_3F_5O$ and structural analysis using I.R. and N.M.R. identified the compound as $CF_3CH_2OCHF_2$.

EXAMPLE 6

Preparation of $CF_3CHClOCHF_2$

Into a small chlorination apparatus equipped with a "Dry-Ice" trap there was placed 129 grams of

$CF_3CH_2OCHF_2$.

The apparatus was purged with nitrogen for 2 minutes. Gaseous chlorine was then bubbled through the liquid while it was illuminated with an incandescent light. The effluent HCl was titrated until approximately one mole of HCl was collected. The reaction product weighed 140 grams indicating an increase in weight of 11 grams. The product was then distilled through a 60 x 2 cm. stainless steel packed column to give pure $CF_3CHClOCHF_2$ identical to the material prepared in Example 3.

In order to determine the potency of 1-chloro-2,2,2-trifluoroethyl difluoromethyl ether as an inhalation anesthetic in combination with oxygen a series of tests were carried out on both mice and dogs. The 1-chloro-2,2,2-trifluoroethyl difluoromethyl ether used was at least 99.5% pure as determined by vapor phase chromatography.

Groups of five mice were placed into a jar and exposed to a concentration of 1.25% by volume of 1-chloro-2,2,2-trifluoroethyl difluoromethyl ether. After an induction time of 1.65 minutes, which was free of excitation, the mice were anesthetized. During the period of anesthesia the mice showed no change in respiration and no visible untoward effects. The mice recovered in 1.1 minutes following removal from the jar and showed no after effects.

Groups of five more mice were then given a similar test with 2.5% by volume of the compound. After an induction time of 0.5 minute an excellent anesthetic syndrome was produced. Anesthesia was deep and relaxation excellent. The induction period was very smooth with no apparent excitation. On removal from the jar the mice fully recovered in 2.35 minutes with no delayed deaths.

Four mongrel dogs weighing between 9.2 and 13.6 kgs. were anesthetized using a closed circuit infant inhalation set. An inhaled concentration of 2.5 to 3% of 1-chloro-2,2,2-trifluoroethyl difluoromethyl in pure oxygen was administered throughout the anesthesia. No premedication was used. The compound produced a smooth induction and uneventful recovery in the dogs. No excitation was noted during induction or recovery. The agent handled easily, most likely because of its low boiling point of 48.5° C. The desired anesthetic level was easily maintained, relaxation was excellent and analgesia was present until recovery. Some salivation was noted in two dogs during recovery, however, the agent did not appear to be irritating to the mucous membranes. No tremor or twitching were noted in any of the dogs.

While the dogs were in a surgical plane of anesthesia 10 gamma/kg. of epinephrine was administered intravenously. The electrocardiogram showed complete two to one and three to one heart block which did not last more than four minutes. The beats that came through were normal. In one dog there was partial inversion of the QRS complex which rapidly returned to normal. All dogs recovered rapidly and uneventfully from the epinephrine challenge. There were no signs of aricular or ventricular tachycardia or fibrillation in any of the dogs.

Following the succesful tests on mice and dogs the compound 1-chloro - 2,2,2 - trifluoroethyl difluoromethyl ether was tested clinically. An operation was performed on a 61-year-old man to repair a gastrectomy that developed an esophageal leak. The object of the operation was to repair the esophageal condition and major surgery in the thoracic cavity was performed.

Preoperational medication included scapolamin and atropine. Unconsciousness was induced using pentothal, after which the patient was switched to a 50/50 mixture of oxygen and nitrous oxide at the rate of 5 liters of each per minute. The compound 1-chloro-2,2,2-trifluoroethyl difluoromethyl ether was then introduced starting at a concentration of 0.5% which was then increased to 1.2%. The latter concentration was sufficient to maintain the patient throughout the operation. During the course of this deep surgical operation the patient's heart remained strong and stable while the patient exhibited good relaxation. Following the operation the patient awakened smoothly with no nausea or other adverse after effects from the anesthetic.

Clinically the agent may be administered by any of the well known techniques used for the administration of general inhalation agents, such as the open drop, semi-closed, and closed systems. The agent may also be administered as an injectable anesthetic as taught by John C. Krantz, Jr. in U.S. Pat. 3,216,897 issued Nov. 9, 1965 and assigned to the assignee of the instant application.

The compound 1-chloro-2,2,2-trifluoroethyl difluoromethyl ether exhibits excellent anesthetic properties. The compound is non-flammable and soda lime stable. It lends itself to effective use as an inhalant in respirable mixtures containing life-supporting concentrations of oxygen as well as mixtures containing oxygen and other inhalation anesthetics such as nitrous oxide. In addition, studies with the agent have shown that it is highly potent, affords good muscular relaxation, is nontoxic, has a high margin of safety, affords rapid induction free of excitation and rapid recovery, affords ease of control of the level of anesthesia and is compatible with ancillary drugs commonly used in connection with anesthesia.

The effective amount of $CF_3CHCl$—O—$CHF_2$ to be employed depends on the level of anesthesia to which the patient is to be brought, the rate at which anesthesia is to be induced, and the length of time over which anesthesia is to be maintained. Volume percentages of $CF_3CHCl$—O—$CHF_2$ in oxygen from a fraction of a percent up to several percent, can be employed. The person controlling the anesthesia can easily regulate the amount of $CF_3CHCl$—O—$CHF_2$ to be used starting with a small amount of the ether and gradually increasing the amount until the desired plane of anesthesia is reached. By then monitoring the physical properties of the patient, as is the usual procedure, the duration and plane of anesthesia can be readily controlled.

While there has been described what are at present considered to be the preferred embodiments of the invention, it will be understood that various modifications may be made therein which are within the true spirit and scope of the invention as defined in the appended claims.

I claim:

1. An inhalant anesthetic composition comprising 1-chloro-2,2,2-trifluoroethyl difluoromethyl ether in admixture with oxygen in suitable proportion for anesthesia.

2. A method of anesthetizing an inhalation anesthetic susceptible mammal which comprises administering to said mammal by inhalation an effective anesthetic amount of 1-chloro-2,2,2-trifluoroethyl difluoromethyl ether along with sufficient oxygen to support life.

3. A method of anesthetizing an inhalation anesthetic susceptible mammal which comprises administering to said mammal by inhalation an amount of 1-chloro-2,2,2-trifluoroethyl difluoromethyl ether sufficient to induce anesthesia.

4. A method of anesthetizing a human being, which comprises administering to said human being by inhalation an effective anesthetic amount of 1-chloro-2,2,2-trifluoroethyl difluoromethyl ether along with sufficient oxygen to support life.

5. A method of anesthetizing a human being, which comprises administering to said human being an amount of 1-chloro-2,2,2-trifluoroethyl difluoromethyl ether sufficient to induce anesthesia.

References Cited
UNITED STATES PATENTS 2,992,276  7/1961  Weinmayr.

JEROME D. GOLDBERG, Primary Examiner

U.S. Cl. X.R.

260—614

UNITED STATES PATENT OFFICE
CERTIFICATE OF CORRECTION

Patent No. 3,535,425          Dated October 20, 1970

Inventor(s) Ross C. Terrell

It is certified that error appears in the above-identified patent and that said Letters Patent are hereby corrected as shown below:

Column 3, line 28, "$CH_3$" should read --$CF_3$--.

Column 4, line 22, "chromatograph" should read

--chromatography--.

Signed and sealed this 1st day of June 1971.

(SEAL)
Attest:

EDWARD M. FLETCHER, JR.
Attesting Officer

WILLIAM E. SCHUYLER, JR.
Commissioner of Patents